United States Patent
Ford et al.

[11] Patent Number: 5,484,293
[45] Date of Patent: Jan. 16, 1996

[54] MOBILE LEARNING LABORATORY FOR MULTI-DISCIPLINE SELF-STUDY

[76] Inventors: M. Barnecut Ford; R. Hirst, both of 16233 Reitan Rd., Bainbridge Island, Wash. 98110

[21] Appl. No.: 269,437

[22] Filed: Jun. 30, 1994

[51] Int. Cl.⁶ ................................................ A47B 39/00
[52] U.S. Cl. ................................ 434/432; 434/219
[58] Field of Search .......................... 434/432, 433, 434/429, 365, 219

[56] References Cited

U.S. PATENT DOCUMENTS

| | | | |
|---|---|---|---|
| 1,142,651 | 6/1915 | Winiecki | 434/432 |
| 1,272,645 | 7/1918 | Fanning | 434/432 |
| 3,604,128 | 9/1971 | Homann | 434/219 |
| 4,004,354 | 1/1977 | Yamauchi | 35/48 R |
| 4,636,174 | 1/1987 | Andersen et al. | 434/335 |
| 4,650,425 | 3/1987 | McGarry | 434/379 |
| 5,354,203 | 10/1994 | Kotch et al. | 434/219 |

*Primary Examiner*—Edgar S. Burr
*Assistant Examiner*—Anthony H. Nguyen

[57] ABSTRACT

A mobile learning laboratory for multi-discipline self-study through exploratory and experiential methods. The learning laboratory is permanently pre-configured eliminating installation or set-up; has physical equipment and consumables for complex investigation. The learning laboratory requires no teacher and can be self-taught or can be used with groups. The lab provides access to remote library resources, and gives operational feedback on its use.

1 Claim, 8 Drawing Sheets

70 | MOBILE LEARNING LABORATORY TEACHING MENU

HUMAN BODY 1

71 | 1. Heart and Lungs

73 | 2. Online - Heart Diseases and Prevention
3. Online - Lungs and Respiration
4. Online - Do your own online research 75 | 5. Write a report 77 | 8. Print more height/weight worksheets
9. Print more heart/lungs worksheets 79 | Q. Quit to another activity

74 HINTS & TIPS

HUMAN BODY 1

1. To use the mouse for "Heart and Lungs" - just point and click the left button. To use the keyboard instead, click on ?...

2. Make sure the printer is on, and has paper, before you begin.

3. Before going online, listen for a dial tone on the mobile learning laboratory phone.

72 | This module teaches about the body: how it works, what it needs to be healthy, and how to develop habits that promote individual health and safety.

Students learn about the internal organs and systems in the body: where they are; what they look like; and what they do. They also learn about diseases and prevention, and the importance of diet and exercise.

76 | LEARNING ACTIVITIES

DIET AND HEALTH
Measure class/team Body Weights
Measure class/team Heights
Plot Weight:Height Ratios
Find a definition of obesity
Find the most common eating disorders
Research what makes a good diet
Analyze daily diet
Write a report comparing ideal vs. actual diet CIRCULATION
Measure class/team pulse rates at rest
Measure pulse rates after 1 min exercise
How long did it take to return to normal?
How is pulse rate related to heartbeat?
Research the factors in fitness
Write a report about fitness and strength
What is the main task of the circulatory system?
Research the materials carried by the blood
Draw a schematic of how blood flows through the body HEART AND LUNGS
Describe the heart, diagram, and label it.
Describe how blood circulates through the body
Describe how blood is oxygenated
Measure lung capacities for team/class
Research the percent of oxygen in the air
Calculate the volume of air the class uses in 1 lesson
Write a report on how to keep a heart healthy
Write a report on heart & lung diseases MORE EXAMPLES
Run animations of heart, lung, and muscles
Write a report on what you saw
Use sugar/salt/vinegar to locate taste buds
Research the tongue to find taste areas
Count and classify your partner's teeth
Research and classify the class's blood groups
Describe the types of joints in the body
Research and write-up a hip replacement
Research and write-up a heart bypass operation
Research and write-up sickle-cell anemia

FIG. 7

After using a mobile learning laboratory, 84% of students reported themselves confident, and competent, in simple statistics, carrying out a lab experiment, and operating a computer. Over 500 experiments were carried out in a seven-day period.

MOBILE LEARNING LABORATORY FOR MULTI-DISCIPLINE SELF-STUDY

BACKGROUND OF THE INVENTION

1. The Field of the Invention

This invention relates in general to education devices, and in particular to education devices where self-study is performed over a range of educational subjects.

2. Background—Description of Related Art

The present invention is a mobile learning laboratory that meets the needs of various people to educate or retrain in diverse disciplines, primarily through self-study. The United States government through analysis of the education and training needs of U.S. citizens in multiple areas has determined that these needs warrant government support through grants in: (1) the self-education of military and other personnel in remote locations; (2) the self-directed re-education of inmates in prisons; (3) the self-sufficiency in computing technologies for U.S. personnel in foreign locations; (4) flexible learning environments for the needs of special education students; (5) the U.S. Department of Education's focus on self-paced learning programs that re-train teachers; (6) for self-directed technology learning programs for students in schools.

The government's consensus across diverse agencies, on the serious need for an effective means of self-directed training, experiential learning, and re-education, indicates the seriousness of the problem to be solved; as is evident in national educational and technology development performance figures contrasted with the performance figures of other nations.

A diversity of inventions and programs have been suggested, attempted, and patented, but they have made no provision for experiential learning and self-directed learning. Most of the proposed solutions to meet this central problem are not adaptable to teaching anything other than a single subject (versus multiple subjects); have technology focused on test-taking and scoring only; and are not designed to be self-instructed without a teacher.

The essential problem of effective self-directed training, experiential learning, and re-education has several sub-issues to be addressed. There is a need for a learning lab:

(1) That is mobile, usable anywhere, and expandable—adjustable work areas and mobility to surmount the barriers of traditional 4-walled learning laboratories or classrooms in schools and businesses cost $100. per square foot with a room typically being 15×30 feet and costing $45,000.

(2) That requires no setup and is permanently pre-configured—eliminating installation or set-up.

(3) That has physical equipment and consumables for complex investigation—onboard and accessible.

(4) That allows learning of complex subjects and multiplicity of subjects—with updating and revising of learning materials from a distance without disturbing the self-directed student.

(5) That can be used by expert and inexpert youths or adults without computer skills—needing no prior computer skills, having users learn through doing.

(6) That requires no teacher—can be self-taught or used with other people, utilizing hands-on exploration methods of scientific, mechanical, or conceptual analysis, at the pace of the individual learner/user.

(7) That improves confidence and ability of non-technical, non-academic learners—utilizes multi-sensory learning by applying more interactive use of students' senses and hands-on skills.

(8) That provides ongoing support for the students/users—that provides communication access that exceeds mere downloading of information, and has a telephone help line.

(9) That monitors itself—to provide feedback concerning its operation.

An example in-depth of one aspect of this problem to be solved has been extensively documented in the area of education for both re-educating teachers as well as educating students. The following information, in pan gathered for the U.S. Department of Education, again proves the need for self-directed technology learning programs for students in schools.

There are not enough trained teachers and not enough practical, experiential learning resources There are two specific areas of need: 1) the ability of science teachers to apply effective instructional methodologies to comply with the requirements of the new curriculum and 2) the ability to provide appropriate technology to enable students and teachers to explore vast areas of problem solving in the area of science.

According to the National Science Board, students "who have progressed through our Nation's school systems should be able to use both the knowledge and products of science, mathematics and technology in their thinking, their lives, and their work" (1983). Achievement of students of ages 9, 13 and 17 in knowledge of scientific facts, understanding of simple scientific principles, application of basic scientific information, analyzing scientific procedures and data, and integrating specialized scientific information show that much remediation is needed to achieve this goal. Of the five areas tested, students of all ages scored up to 93 percentage points lower in applying basic scientific information, analyzing scientific procedures and data, and integrating specialized information than in knowledge of scientific facts (Science and Engineering Indicators, 1991).

Fewer than 40 percent of public school eighth graders in the United States in mathematics and science classes have any access to microcomputers (NELS:88).

In one state that deals with many at-risk students, North Carolina, most science learning leaves out the participatory, problem solving and discovery activities that characterize science and technology, and motivate students to make the effort to understand these subjects.

Teachers spend little time on subjects they are uncomfortable with

The North Carolina Department of Public Instruction (NCDPI) reported that elementary teachers spend only 19 percent of the instructional time in science on hands-on activities. Middle school science teachers spend 23 percent of their instructional time on hands-on activities and high school science teachers just 9 percent (1990).

Student test scores in science in the Winston-Salem/Forsyth County middle schools, grades six and eight, rank last of all four core academic subjects. Also, more students at the middle grade level are reported to receive below average and failing grades in science than in any of the other core academic subjects.

Current instructional strategies and tools are not enabling our students to achieve.

Students are expected to achieve certain state mandated competencies in the middle grades. Current 5th graders in Winston-Salem/Forsyth County will be expected to demonstrate these competencies upon exiting the 8th grade. These competencies are as follows: 1) understand important issues of a technology based society and exhibit ethical behavior in the use of technology, 2) demonstrate knowledge and skills using computer technology, and 3) use a variety of technologies to access, analyze, interpret, synthesize, apply and communicate information. (see page 5, "School Level Strands Guide" for more specific grade level information). The only time dedicated to these competencies currently is a six week keyboarding course delivered to sixth graders. Teachers need help—present teacher training does not prepare teachers to teach state mandated curricula.

The dilemma of lack of teacher training in technology is coupled with an even greater problem in middle grades science. Teachers are expected to utilize a new process oriented curriculum, but they are not trained nor are they comfortable in doing so. The State Department of Public Instruction and local education agencies have recognized this fact and agree that the greatest needs in implementing the new science curriculum will be: 1) to increase student access to effective instructional methodologies to comply with national standards and the new state curriculum for science and 2) to provide appropriate technology to enable students and teachers to explore science curriculum through problem solving.

There have been numerous techniques and electronic apparatus devised to aid people in learning, but these have proved to have severe drawbacks in terms of not aiding experiential learning, in not being pre-configured or easily set-up, for not functioning without a teacher, and having limitations in the range of subjects that can be learned.

In order to provide background information so that the invention may be completely understood and appreciated in its proper context, reference is made to a number of prior art patents as follows:

Several techniques have been devised for enabling a teacher more easily to convey information and understanding to a class. The techniques have been limiting in that interaction between the student and the teacher may be limited to test-taking and scoring, e.g. responses to multiple-choice type questions, or questions requiring simple numerical answers.

Examples of such techniques include those described in U.S. Pat. No. 3,656,243; U.S. Pat. No. 3,694,935; U.S. Pat. No. 3,716,929; and U.S. Pat. No. 4,004,354. This last U.S. patent also provides the teacher with a readout of the percentage of students answering a question correctly, but does not provide a vehicle for further discussion and exploration of concepts which appear to be difficult to grasp.

U.S. Pat. No. 5,002,491 also discloses a system where a teacher can monitor class feedback. Other objectives of the system are to automate quizzes, grade homework, and keep class attendance rolls and other routine paperwork. In addition, U.S. Pat. No. 5,002,491 aims to provide some student instruction, but only in the form of computer based instructional exercises. Other, non-computer based learning is not provided.

Other proposed systems have taken advantage of advances in technology to interconnect a number of students, for purposes of gathering information, or facilitating access to instructional programs. One example is U.S. Pat. No. 4,636,174, which enables students to download instructional programs from a central computer, which acts as a sort of file server.

Another example is U.S. Pat. No. 4,759,717, which discloses networking structure for connecting conventional personal computers. This approach is directed more toward providing, at a central location, an instructional program which may be downloaded locally so that students can learn various types of computer programs.

U.S. Pat. No. 4,764,120 describes a student response system, that is intended to collect data of a limited nature (e.g. responses to multiple-choice questions) from a number of classrooms. There is no provision for experiential learning. This feature is also absent from the other U.S. patents mentioned above.

Other computer-based teacher aids aim to provide systems where the teacher can selectively view or control a student's own individual monitor or viewing screen. U.S. Pat. No. 4,652,240, which particularly relates to the training of students to use computers, gives the teacher the ability to show the contents of the teacher's own monitor on each student's individual monitor or screen. U.S. Pat. No. 4,715,818 also discloses a similar approach, with the ability in addition, to selectively view the contents of a student's screen at the teacher's work station. Neither of these U.S. patents makes provision for the use of other teaching devices or apparatus.

None of the U.S. Patents mentioned above contain provision for mobility, address the issues that teachers voice about the seeming complexity of set-up for such multiple connected devices, or provide systems aimed at use by unskilled teachers and students.

Some U.S. patents, such as U.S. Pat. No. 4,332,568, do address these issues in the classroom. U.S. Pat. No. 4,332,568 discloses a modular teaching and demonstrating cabinet, used to teach and demonstrate electrical principles and operations. This system is portable and self-contained, so it can be taken to where it is needed, and pre-wired, to reduce the inconvenience of repeated apparatus setup during a school day. It is only suited to teaching wiring principles and operations, and does not make provision for the teaching of other subjects.

Whatever the precise merits, features and advantages of the above cited references, none of them achieves or fulfills the purposes of the present invention.

It would be desirable to have a scheme that could respond to a wider range of subjects, that is designed to be self-instructing without a teacher. There are special-purpose inventions but they are not adaptable to teaching anything else, such as multiple subjects. Most of the previously-cited patents are for systems that only offer computer-based based instruction, that do not facilitate the exploration of concepts that are complex or difficult to grasp.

It follows that there is a need for an invention that provides an instructional platform that exceeds mere computer-scoring and test-taking methods. There is a need for a mobile learning laboratory equipped for exploratory and experiential learning that is pre-configured, eliminating installation. There is a need for a learning laboratory that has physical equipment and consumables for complex investigation and that requires no teacher and can be can be used by individuals or with groups. There is a need for a learning laboratory that provides access to remote library resources, and gives operational feedback.

In summary, it is desirable to have an invention which monitors pieces of equipment integrated in an entire unit directed by the individual learner, and suitable for the multi-sensory learner, is mobile, is pre-configured for easy set-up and addresses the needs of unskilled teachers and students who benefit from self-directed study.

SUMMARY OF THE INVENTION

Our invention consists of a mobile learning lab: (1) that is mobile and has expandable work areas that is not limited to conventional installation sites; (2) that is permanently pre-configured eliminating installation or set-up; (3) that has physical equipment and consumables for complex investigation; (4) that allows learning of complex subjects or greater plurality of subjects; (5) that can be used by both skilled and unskilled learners (youths or adults); (6) that requires no teacher and can be entirely self-initiated and self-taught or used with other people; (7) that is accessible to the non-technological multi-sensory learner; (8) that provides communication access to remote systems and library resources that exceeds downloading of information; (9) where the lab monitors itself to provide feedback concerning its operation.

The advantages of a mobile learning laboratory are significant and varied:

(1) It can be used anywhere, saving typical expensive costs of 4-walled learning laboratories or classrooms in schools and businesses that often cost $100. per square foot.

(2) No installation is necessary, the invention is permanently pre-configured.

(3) Equipment and consumables for complex investigation are onboard, centralized.

(4) Learning materials can be updated and revised from a distance which allows learning of complex subjects and multiplicity of subjects, without disturbing the self-directed student.

(5) No prior computer skills are needed, the invention can be used by expert and inexpert youths or adults.

(6) Can be self-taught or used with other people, the invention works without a teacher at the pace of the individual learner/user.

(7) Utilizes multi-sensory learning by applying more interactive use of students' senses and hands-on skills, improves confidence of the non-academic or non-technical learner.

(8) The invention provides communication access that exceeds downloading of information, students have ongoing support and a telephone help line.

(9) The invention provides feedback concerning its operation, and monitors itself in operation.

BRIEF DESCRIPTION OF THE DRAWINGS

FIG. 7 is an exemplary diagram illustrating the use of an interactive device in operating a mobile learning laboratory.

DESCRIPTION OF THE PREFERRED EMBODIMENTS

Figure 1:
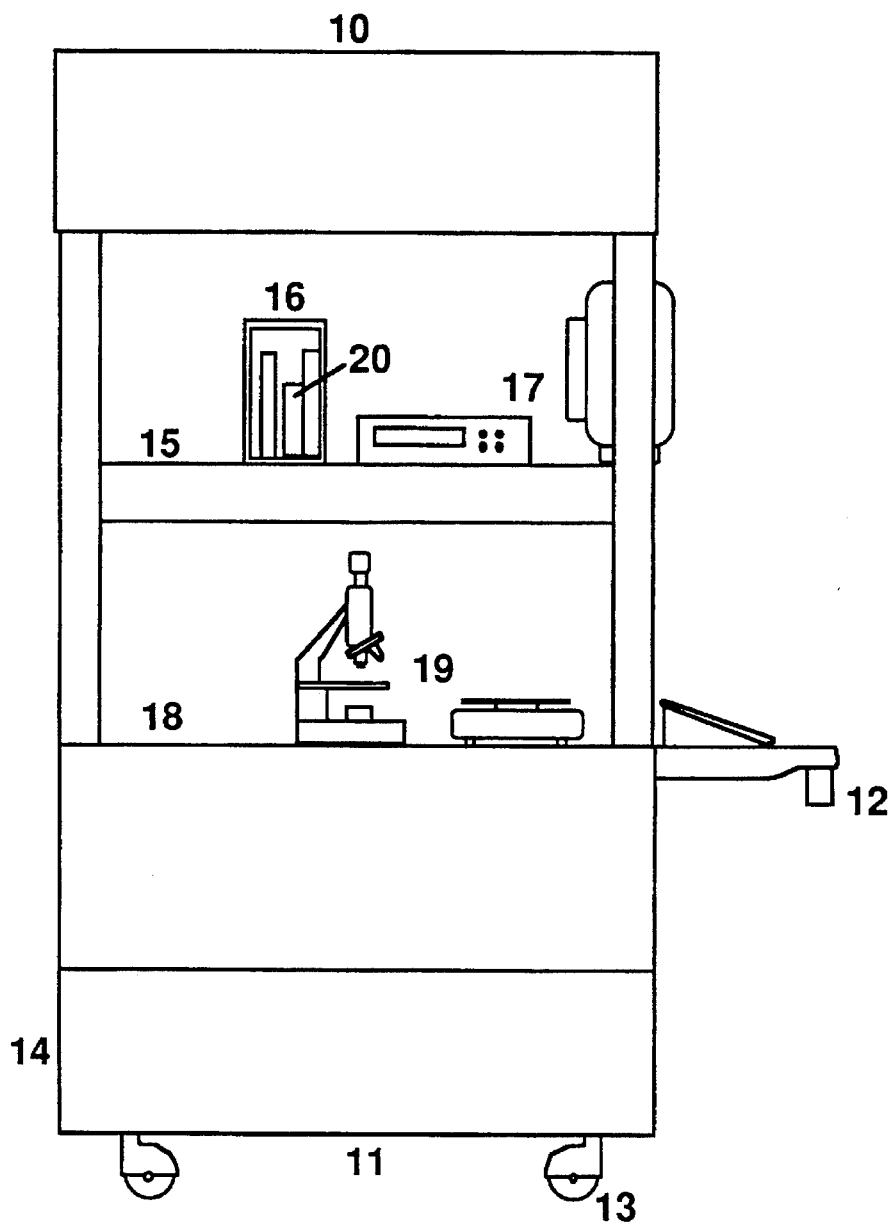
FIG. 1 is a side elevation of a mobile learning laboratory in accordance with the present invention.

The following is a list of reference numerals used in the drawings:

10 Mobile learning laboratory
11 Mobile platform
12 Handles
13 Wheels
14 Receptacle to house equipment
15 Shelving
16 Receptacle for consumable supplies
17 Interactive devices
18 Working surfaces
19 Experimental devices
20 Consumable items
30 Operator training means
32 Power cord
34 Phone line connector
40 Power cord take-up spool
41 Power unit
42 Power/signals unit
43 Signal socket
44 Power socket
45 AC power socket
46 Connection sensor unit
47 Connection monitor unit
50 Phone line connector spool
51 Modem
52 Signal connection
53 Power connection
60 Part of Flowchart—Mobile learning laboratory becomes operational
61 Learning path—Recording pulse/blood pressure
62 Learning path—Review heart/ling structure
63 Learning path—Review disease information
64 Learning path—Simulate heart/lung operation
65 Learning path—Access known research
66 Part of Flowchart—Publish research paper
67 Part of Flowchart—Produce videotape
70 Teaching menu
71 Menu entry—heart and lungs
72 Description of education module
73 Menu entry—online research activities
74 Operator training hints
75 Menu entry—Access report-writing help
76 Learning activities
77 Menu entry—request printed worksheets
79 Menu entry—select new education module
80 Horizontal axis of exemplary histogram
82 Vertical axis of exemplary histogram
84 Light-shaded columns of histogram
86 Dark-shaded columns of histogram Refer to FIG. 1, a mobile learning laboratory 10 in accordance with the invention includes a mobile platform 11 having handles 12 and wheels 13 for moving the mobile platform between locations.

The mobile platform 11 has an enclosed receptacle 14 to house equipment, and shelving 15 to hold receptacles 16 of consumable items 20 and interactive devices 17. The working surfaces 18 have sections that are hinged and latched so that they can be fixed in a horizontal position when in use, and folded down when the mobile learning laboratory 10 is being moved or stored. Experimental devices 19 are stored on shelving 15 and on the fixed parts of working surfaces 18.

Figure 2:
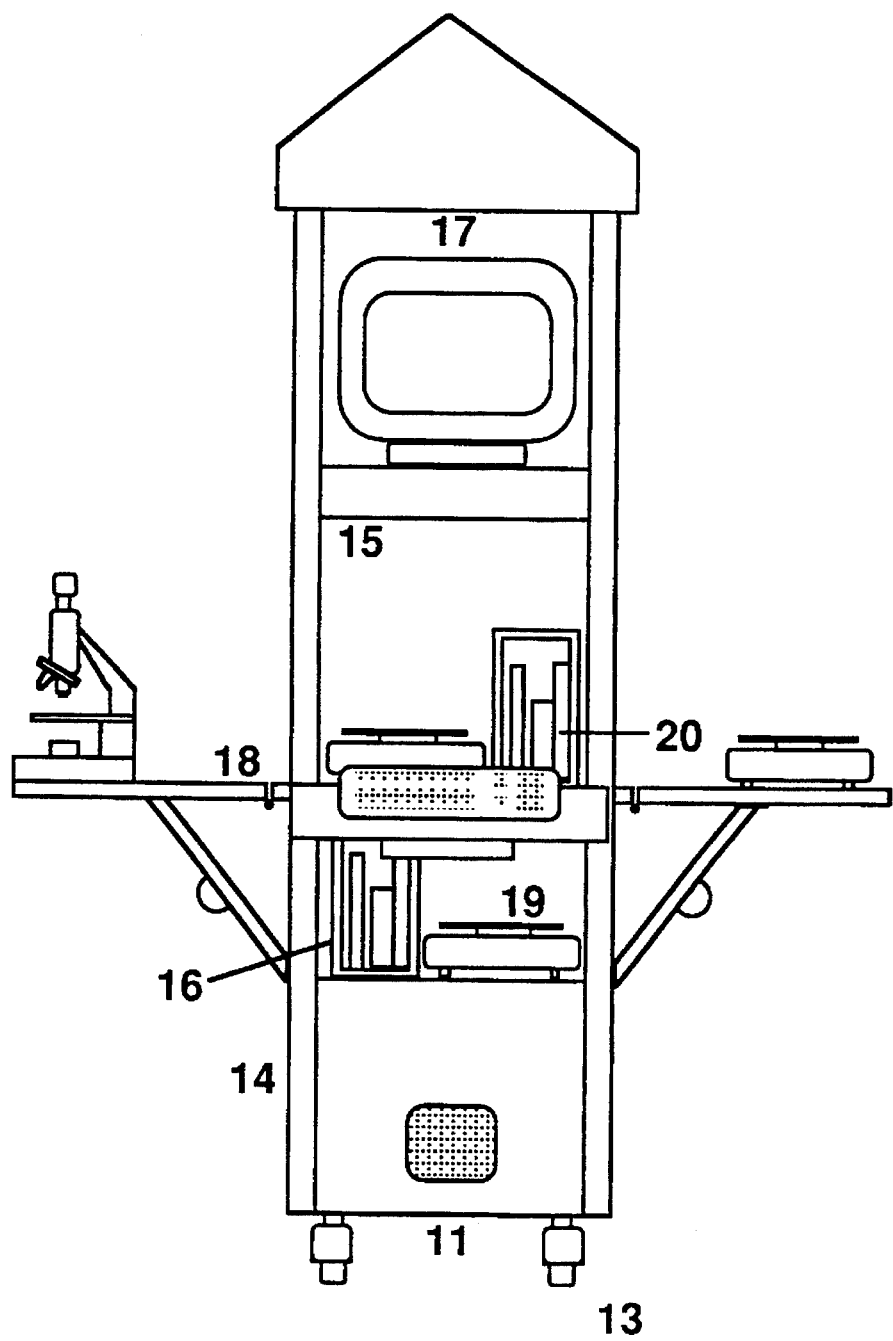
FIG. 2 is an end elevation of a mobile learning laboratory in accordance with the present invention.

FIG. 2 illustrates an end elevation of the mobile learning laboratory, with the working surfaces 18 raised and latched ready for use.

Interactive devices 17 may include any devices that facilitate interaction with the student. These include but are not limited to devices with monitors with touch-sensitive screens, such as video-disk players. Interactive devices 17 may also include but are not limited to devices with keyboards and display screens, such as personal computers. One embodiment of the invention has, as an interactive device 17, a personal computer with color graphics screen, loudspeakers and microphone, a printer capable of producing text and graphics, and a CD-ROM drive.

Experimental devices 19 may include any apparatus required for experiential learning in the subjects being learned. These include but are not limited to laboratory balances, microscopes, thermometers, water baths, pulse-rate meters, or robotic assemblies.

Consumable items 20 are used by many of the interactive devices 17 and experimental devices 19. Consumable items 20 are objects and materials including but not limited to blank paper, printer ribbons, videotape, candy, peanuts, and map pins. Receptacles 16 provide a convenient means for storing additional quantities of consumable items 20.

Figure 3:
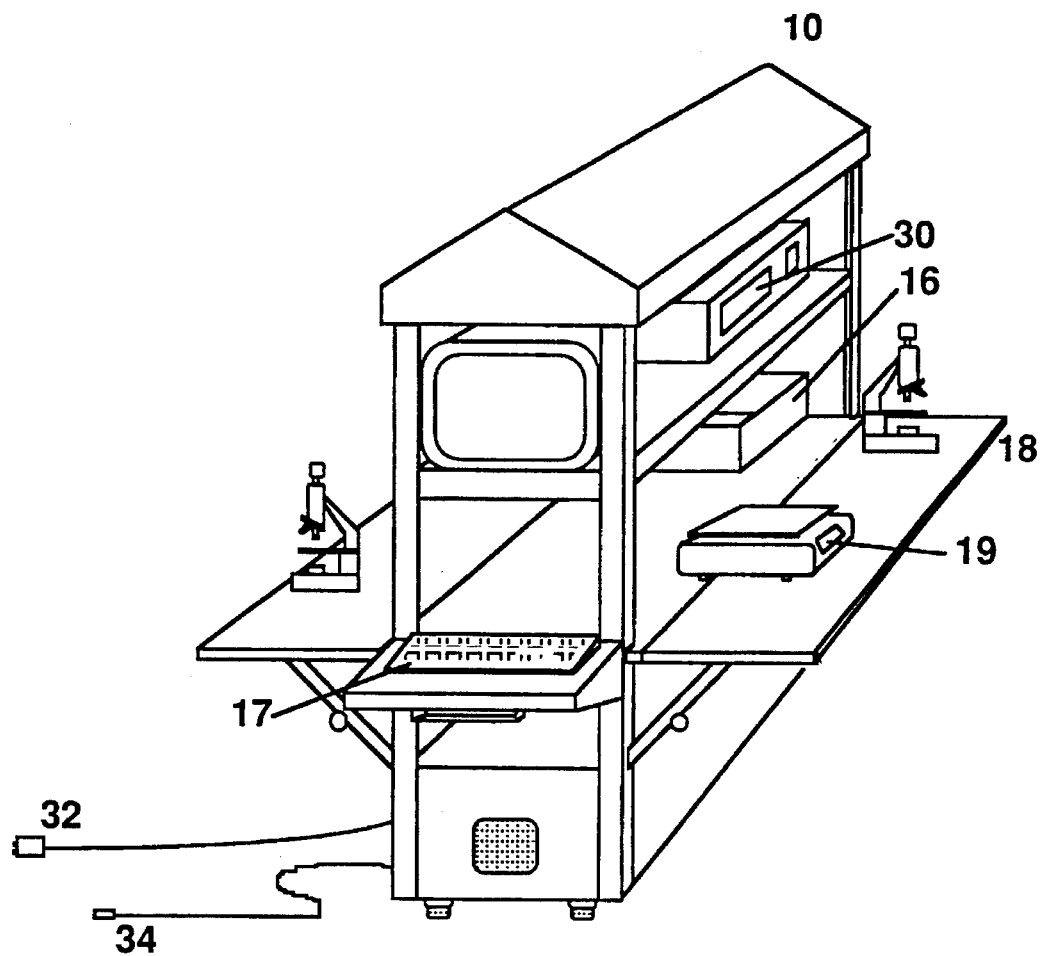
FIG. 3 is a perspective view of a mobile learning laboratory, illustrating the receptacles and working surfaces.

FIG. 3 shows an overall perspective view of a mobile learning laboratory 10, with the working surfaces 18 raised and latched ready for use. Interactive devices 17 and experimental devices 19 are available for use on the working surfaces 18. Receptacles 16 holding consumable items 20 are available.

The first step in operating the mobile learning laboratory 10 is to connect the power cord 32 to a suitable electrical power outlet. Plugging the phone line connector 34 into a suitable phone jack is necessary if access to remote devices is required.

Operating training means 30 allow the student to learn the operation and use of interactive devices 17 and experimental devices 19. One implementation of the mobile learning laboratory 10 uses a videotape player, with videotapes prepared to demonstrate use of the mobile learning laboratory 10, interactive devices 17, experimental devices 19, and consumable items 20.

Figure 4:
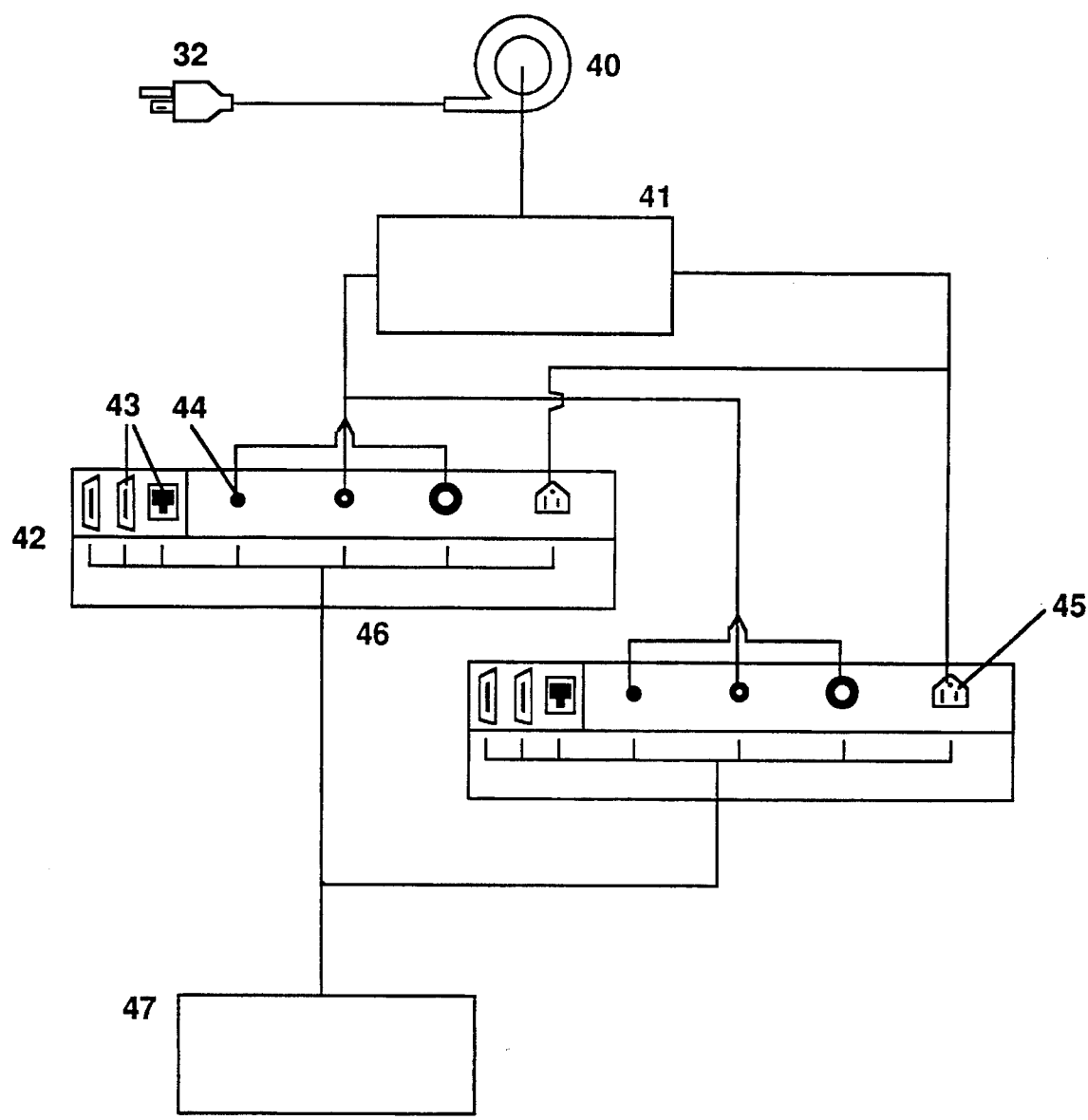
FIG. 4 is a schematic diagram of a mobile learning laboratory, illustrating the power supply, electrical apparatus, and connection of experimental and interactive devices.

FIG. 4 is a schematic diagram illustrating the power supply, electrical apparatus, and connection of experimental devices and interactive devices.

The power cord 32 is fitted with a plug for conventional 110VAC electrical power, and is stowed on a power cord take-up spool 40. In one implementation of the invention, a commercially available power unit 41 divides this electrical supply into several separate power voltages/phases. The power supply 41 supplies each of these voltages to the power/signals unit 42.

The power/signals unit 42 consists of a number of signal sockets 43, a number of power sockets 44, an AC power socket 45, and a connection sensor unit 46. There may be a plurality of power/signals units 42 on a mobile learning laboratory 10.

The signal sockets 43 are part of the network means for transmitting data between experimental devices, interactive devices, and remote systems. In one implementation of the invention, a signal socket 43 is used to accept an RS-232 data link from an experimental balance, enabling experimental data to be collected, stored, and graphed on a computer system. Signal sockets 43 are also used to provide a network means for transmitting data to and from another mobile learning laboratory 10 connected as a slave platform. In one implementation of the invention, a signal socket 43 used for this purpose is a standard phone jack.

The power sockets 44 provide the various types of power supply needed by experimental devices and interactive devices. In one implementation of the invention, these types of power supply were 5VDC, 9VDC, and 12VDC. The AC power socket 45 is used to provide power to experimental or interactive devices requiring 110VAC. It is also used to provide a 110VAC power source for another mobile learning laboratory 10 connected as a slave platform.

Further configurations in accordance with the invention include that of a slave platform, where the power cord 32 and the phone line connector 34 are plugged into an AC power socket 45 and a signal socket 43 of a power/signals unit 42 on a nearby mobile learning laboratory 10. Multiple mobile learning laboratories 10 may then be operated in environments with limited power and phone outlets. Slave platform configurations also make it possible to use the experimental and interactive devices from separate mobile learning laboratories 10 in combination as a single entity.

The connection confirmation means, in one implementation of the invention, is made up of connection sensor units 46 and a connection monitor unit 47. The connection sensor unit 46 is the connection sensor means by which the integrity of power and signal connections is detected. The connection sensor unit 46 tests the several circuits for continuity and reports out-of-line conditions to the connection monitor unit 47. The connection monitor unit 47 alerts the user to failed or failing connections.

Figure 5:
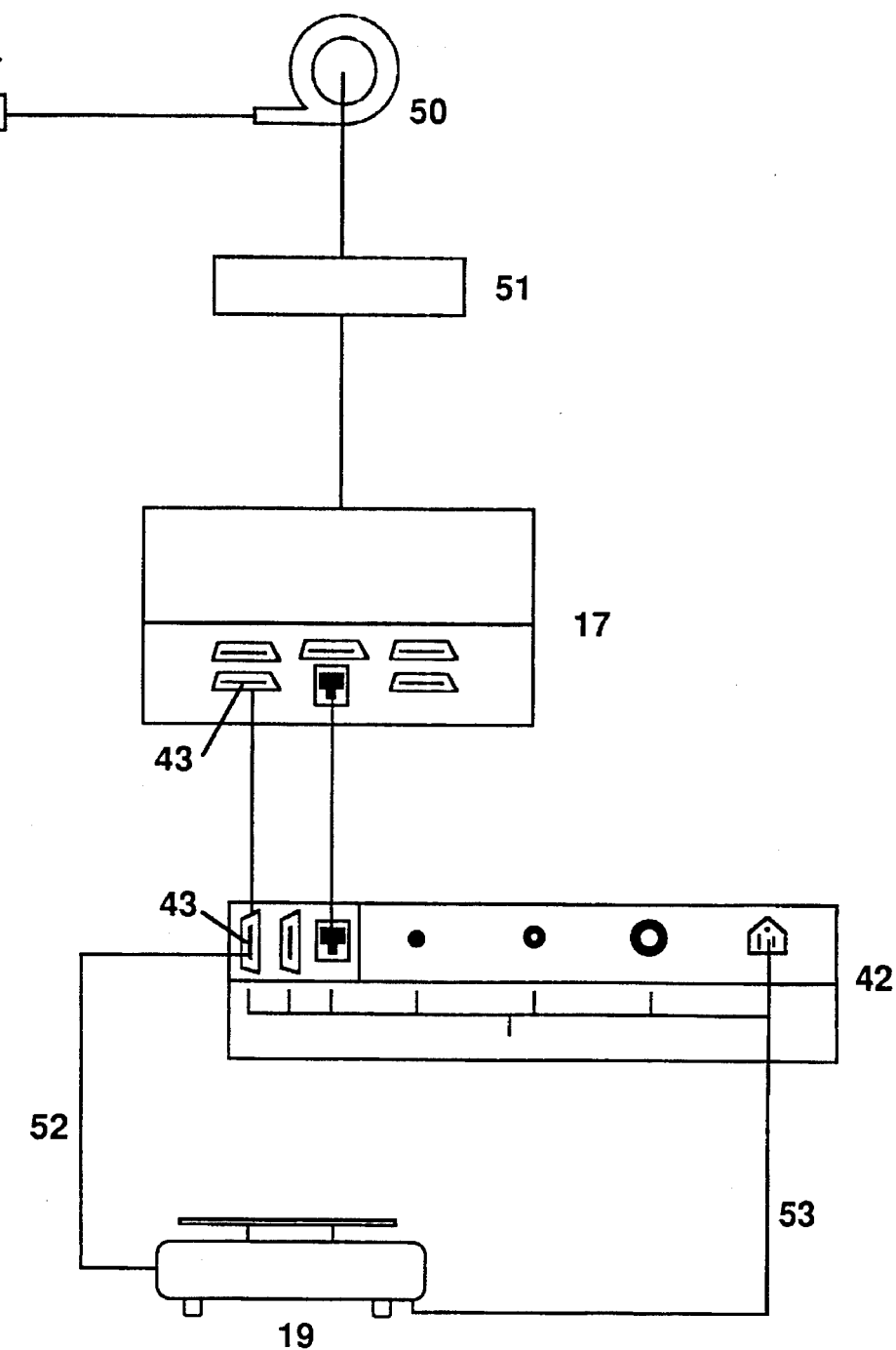
FIG. 5 is a schematic diagram of a mobile learning laboratory, illustrating the flow of signals between experimental and interactive devices, and the network.

FIG. 5 illustrates the network means for transmitting data between experimental devices 19, interactive devices 17, remote systems, and remote library resources.

FIG. 5 is a schematic diagram illustrating the flow of signals between experimental and interactive devices, and the network. A phone line connector 34 is connected via a phone line connector spool 50 to a modem 51. The modem 51 is connected in turn to an interactive device 17 that has a number of signal sockets 43 which are connected to signal sockets 43 on a power/signals unit 42. An experimental device 19 may have a signal connection 52 to facilitate the transfer of data to and from the experimental device 19 and the power/signals unit 42. This is separate from the power connection 53 that provides electrical power to the experimental device 19.

In one implementation of the invention, this scheme enables a personal computer acting as an interactive device 17 to connect to the Internet and to commercial timesharing computer services for the purposes of accessing library resources such as the Library of Congress, research data and other educational materials. It also enables experimental data from chemical balances to be captured and graphed in real time, as an experiment is under way.

The replenishment warning means is a function that may be provided over the network means, giving warning of the impending need to replenish consumable items. Replenishment of consumables 20 may be facilitated in accordance with the invention. Because experimental devices 19 and interactive devices 17 may be connected via the network means, one implementation of the invention uses the network means to count the usage of sheets of paper when producing graphs, worksheets, and research reports. When usage reaches a pre-defined threshold, a message is sent over the network means to request replenishment of paper stocks held in the receptacles 16 for consumable items 20. A similar scheme is applied to perishable consumables 20 used by experimental devices such as chemical balances.

Instruction update means is also provided in accordance with the invention, using the network means provided above. This facility is valuable in self-learning environments, where no supervisors or teachers are present. Instructions may be replacements to existing educational material, supplements to such material, or new units of instruction to be added to tile repertoire on a mobile learning laboratory 10. Such instruction updates are transmitted from a remote mobile learning laboratory 10, in one implementation of the invention, to another mobile learning laboratory 10. The transmission uses dial-up telephone lines, modems 51, and personal computers acting as interactive devices 17 on both learning laboratories 10. Instruction updates may include but are not limited to instructional texts, reference materials, simulation routines, and information on the use and operation of interactive devices 17, experimental devices 19, and other aspects of tile mobile learning laboratory 10.

Figure 6:
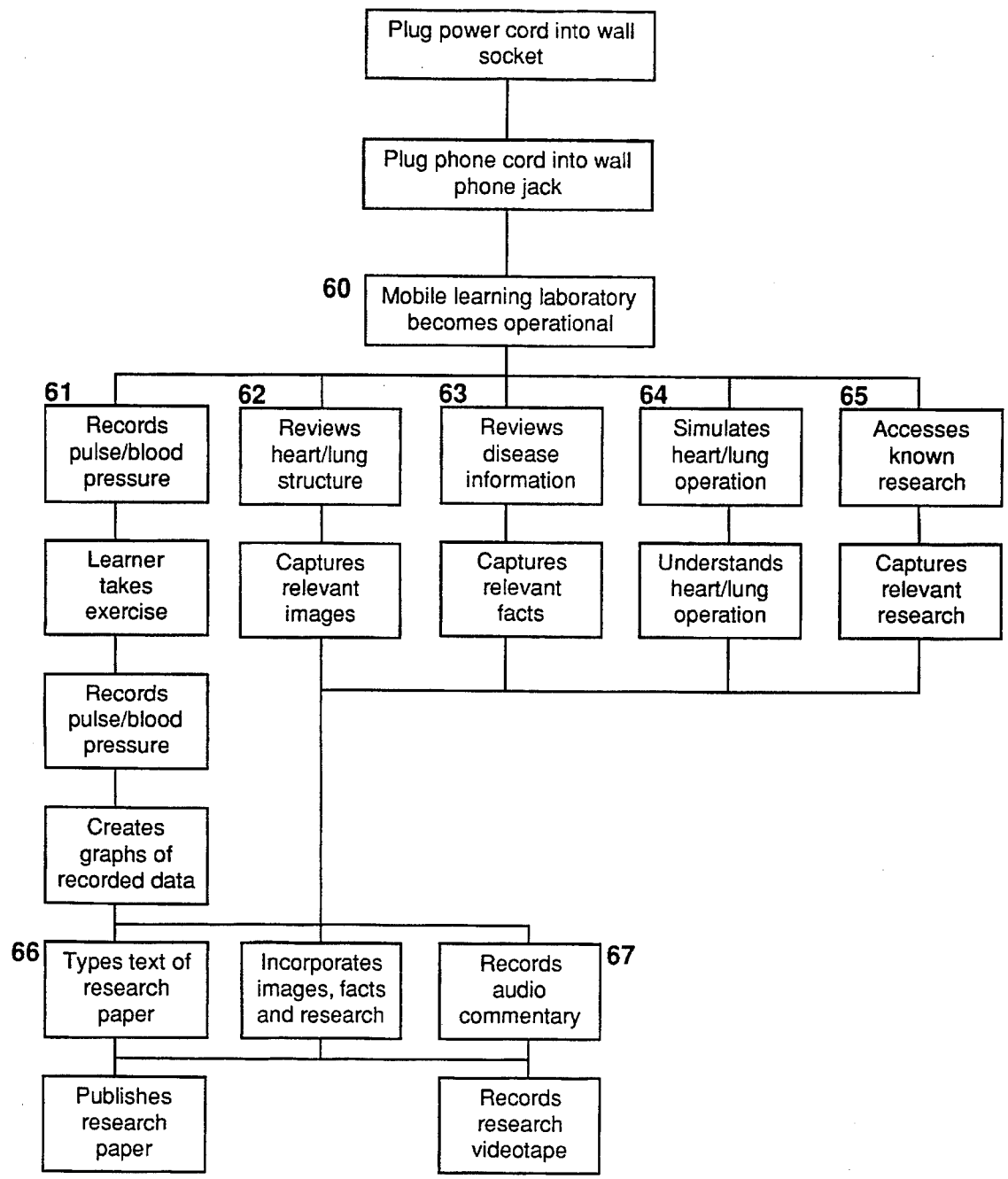
FIG. 6 is an exemplary flow chart illustrating learning flow in accordance with the present invention.

FIG. 6 is an exemplary flow chart illustrating learning flow in accordance with the present invention. In one implementation of the invention, an education module exists which provides facilities and resources for learning about human heart and lungs. This education module is used without a teacher present.

Because no teacher is present, it is important that the mobile learning laboratory 11 becomes operational without assistance and without connecting components together, as is shown in 60 "mobile learning laboratory becomes operational". It is only necessary to plug the power cord into a conventional wall outlet, and connect the phone cord to a telephone jack.

The student is then free to choose any of the learning paths on the flowchart, in any desired sequence. Learning path 61 has the student measuring his/her own pulse rate and blood pressure, using the experimental devices available; then taking exercise and repeating the measurements; then creating graphs to compare the data gathered. Learning path 62 enables the student to use an interactive device (in this case a color display on a personal computer) to explore detailed images of heart and lung organs, with cross-sections to show detailed structure and detailed magnified images of tissue dissections to show structure at a cellular level. Remote systems are accessed, via learning path 63, to determine common heart/lung diseases, causes, cures and prevention by accessing online material. Learning path 64 gives the student the opportunity to watch a heart beating and lungs breathing, to understand in depth how these organs work. Both computer simulations and real electrocardiograph images are used. Learning path 65 enables the student to see for himself/herself the status of current medical research on human cardiovascular diseases, in this case by using the remote connection to access the published research reports of a major teaching hospital.

The student then learns to collate and present his/her learning, using assistance provided by the mobile learning laboratory 11. Using prompting techniques, the student is guided through the process of 66 publishing a research paper. The student may also choose to publish an audiovisual record, following flowchart path 67 produce videotape, making use of the microphones and visual editing capabilities of an interactive device 17.

FIG. 7 is an exemplary diagram illustrating the use of an interactive device 17 in operating a mobile learning laboratory. The diagram shows information presented for one education module in an implementation of the mobile learning laboratory 10. The information is available on the display screen of the interactive device 17, as printed material as a consumable item 20, and on a training videotape as part of the operating training means 30.

The education module illustrated is about the human body. The interactive device 17 shows a teaching menu 70, from which the student makes selections. Selecting menu entry—heart and lungs 71 gives the student access to visual material and text about heart and lung tissue, structure, function, and pathology. Some of this material is in the form of simulations, that show clearly the mechanisms involved in breathing, and the action of the heart in pumping blood.

Menu entry—online research activities 73 gives the student online access to textbook materials on heart and lung diseases and prevention. It also gives access to medical research databases, using the network means 50.

Menu entry—access report-writing help 75 gives the student assistance in compiling a research report, using a pre-formatted report format and a word processor.

Several of the learning activities 76 are simplified by the use of pre-printed worksheets for recording experimental data, which are available as a consumable item 20. Further copies may be printed on demand by selecting menu entry—request printed worksheets 77.

Menu entry—select new education module 79 returns the student to a master menu, to request other education modules.

An overall description of the education module 72 defines the scope of this individual module.

Learning activities 76 describe the experiential learning activities that are possible, using this education module, on this implementation of the mobile learning laboratory 10.

Figure 8:
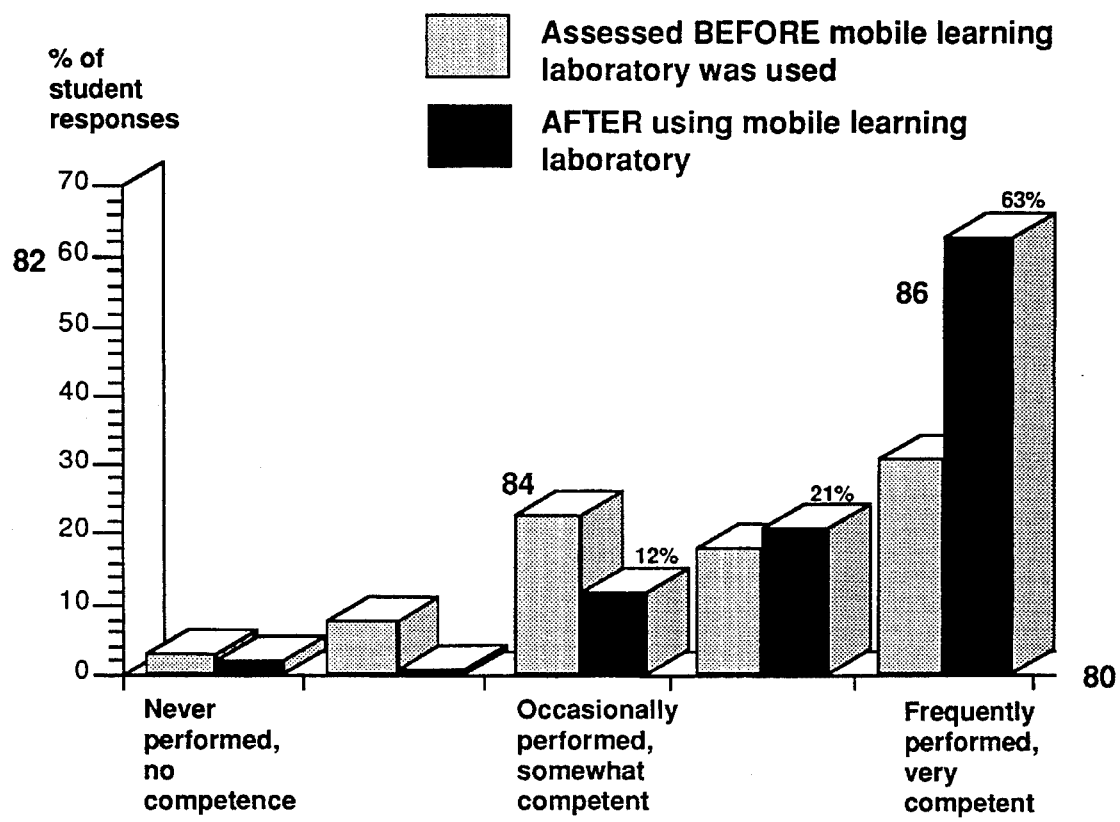
FIG. 8 is an exemplary histogram showing the effectiveness of learning when using a mobile learning laboratory, compared with the same learning task performed without a mobile learning laboratory.

FIG. 8 is an exemplary histogram showing the effectiveness of learning when using a particular embodiment of a mobile learning laboratory 10. The data is taken from specific series of tests, comparing the learning success of students without access to a mobile learning laboratory 10, to the learning success of students who did have access to a mobile learning laboratory 10.

The scale on the horizontal axis 80 ranks the ability of a specific group of students to perform a lab experiment and chart the results. Rankings are in five categories; the lowest is "Never performed, no competence"; the highest is "Frequently perfomed, very competent".

The scale on the vertical axis 82 shows the percentage of students in the group who responded.

On the histogram, light-shaded columns 84 show the student rankings without access to a mobile learning laboratory 10. Dark-shaded columns 86 show the corresponding rankings with access to a mobile learning laboratory 10.

There was a marked improvement in learning in those students who had access to a mobile learning laboratory 10. With over 500 experiments carried out by the students themselves in a seven-day period, 84% of students reported themselves confident and competent in carrying out a lab experiment and charting the results.

There are many possible implementations in accordance with the invention. Possible implementations include its use in many self-learning environments where no teacher is available, as well as environments where there is access to a teacher or supervisor. Self-learning environments include, but are not limited to, self-study anatomy revision for State licensing examinations for professional masseurs; reading-for-comprehension of American literature; research projects into pollution and tropical diseases; library study for adults and children; and experiments exploring the control of radio-controlled robots. Supervised environments include special education units for disabled people; studies of native American folklore; the teaching of biology; ongoing studies of NASA space exploration; and the teaching of math and science by non-science teachers.

Possible implementations of interactive devices in accordance with the invention may include but are not limited to videodisk players, CD-ROM players, online computer terminals, and personal computers.

Possible implementations of experimental devices in accordance with the invention may include but are not limited to laboratory balances, microscopes, thermometers, water baths, pulse-rate meters, or robotic assemblies.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A mobile learning laboratory adapted for instruction of a human individually, or a plurality of humans simultaneously, which comprises:

a plurality of experimental devices each including means for demonstrating and teaching;

a plurality of interactive devices for presenting visual, audible, touch, taste, and smell information and receiving human responses;

consumable items comprising a plurality of consumable materials and a plurality of consumable objects associated with said experimental devices and said interactive devices;

a plurality of operator training means, associated with said experimental devices, said consumable items, and said interactive devices for allowing the human to learn the operation and use of said experimental devices, said consumable items, and said interactive devices;

network means for transmitting data between said experimental devices and said interactive devices and remote systems and remote library resources;

electrical apparatus comprising a plurality of electrical connector means associated with said experimental devices and said interactive devices for permanently connecting said experimental devices and said interactive devices for the supply of electrical power and signals;

connection confirmation means, associated with said experimental devices and said interactive devices and said electrical apparatus, for identifying failures of said electrical apparatus and failures of connections between said electrical apparatus;

replenishment warning means, associated with said experimental devices and said consumable items and said interactive devices, for periodic replenishing of said consumable items;

instruction update means, associated with said experimental devices and said consumable items and said interactive devices, for modifying or adding to contents of said instruction;

power supply means, associated with said electrical apparatus, for providing a plurality of electrical power supplies to said experimental devices and said interactive devices;

a mobile platform having handle means and wheel means for moving the platform between locations and a plurality of receptacles and a plurality of surfaces for mounting and storing said experimental devices, said consumable items, and said interactive devices;

said receptacles comprising a plurality of compartments for carrying said consumable items;

working surfaces comprising a plurality of supporting surfaces for said experimental devices and including hinge means and latch means for stowing the working surfaces when moving said mobile platform;

slave platform connection means, associated with said experimental devices, said interactive devices, said network means, said electrical apparatus, said mobile platform, and said working surfaces, for connecting said experimental devices, said interactive devices, said network means, said electrical apparatus on a plurality of said mobile platforms.

* * * * *